United States Patent [19]
Shirasaki

[11] Patent Number: 5,982,539
[45] Date of Patent: Nov. 9, 1999

[54] OPTICAL DEVICE

[75] Inventor: Masataka Shirasaki, Kawasaki, Japan

[73] Assignee: Fujitsu Limited, Kawasaki, Japan

[21] Appl. No.: 08/807,280

[22] Filed: Feb. 28, 1997

[30] Foreign Application Priority Data

Jun. 20, 1996 [JP] Japan .................................. 8-158721
Jul. 17, 1996 [JP] Japan .................................. 8-187260

[51] Int. Cl.$^6$ .................................................. G02B 5/30
[52] U.S. Cl. ...................... 359/484; 359/496; 359/497; 385/11
[58] Field of Search .................................. 359/484, 494, 359/495, 496, 497; 385/11, 15, 39

[56] References Cited

U.S. PATENT DOCUMENTS

| 4,548,478 | 10/1985 | Shirasaki . | |
|---|---|---|---|
| 4,650,289 | 3/1987 | Kuwahara . | |
| 4,852,962 | 8/1989 | Nicia | 359/484 |
| 5,048,937 | 9/1991 | Takeda et al. | 359/484 |
| 5,319,483 | 6/1994 | Krasinski et al. | 359/484 |
| 5,446,578 | 8/1995 | Chang et al. | 359/484 |
| 5,768,005 | 6/1998 | Cheng et al. | 359/484 |

FOREIGN PATENT DOCUMENTS

| 0015129A1 | 9/1980 | European Pat. Off. . |
|---|---|---|
| 0421654A1 | 4/1991 | European Pat. Off. . |

OTHER PUBLICATIONS

M. Koga, "Compact Quarzless Quasi Optical Circulator", Electronics Letters, vol. 30, No. 17, Aug. 18, 1994.
Japanense Abstract No. 57–100410 (Dec. 15, 1980).
Japanese Abstract No. 60–130934 (Dec. 20, 1983).
M. Koga, et al. "Polarization–Insensitive High–Isolation Optical Nonreciprocal Device for Circulator Application", vol. 91, No. 61, pp. 1–6, (May 24, 1991).

*Primary Examiner*—Cassandra Spyrou
*Assistant Examiner*—Darren E. Schuberg
*Attorney, Agent, or Firm*—Staas & Halsey

[57] ABSTRACT

Light input from a first optical fiber is split up into two orthogonally-polarized beams by a polarizing prism. Their polarization planes are rotated by a 45-degree Faraday rotator. The beams are refracted by a birefringent wedge as extraordinary light, and finally output to a fourth optical fiber. The light output from the fourth optical fiber is refracted by a birefringent wedge as ordinary light, and enters a second optical fiber. Similarly, the light from the second optical fiber is led to a third optical fiber, thereby implementing a capability of an optical circulator. Light output from the first optical fiber can be input to the third optical fiber by inverting a rotation angle of the 45-degree Faraday rotator. As a result, it serves as a magneto-optical switch.

42 Claims, 12 Drawing Sheets

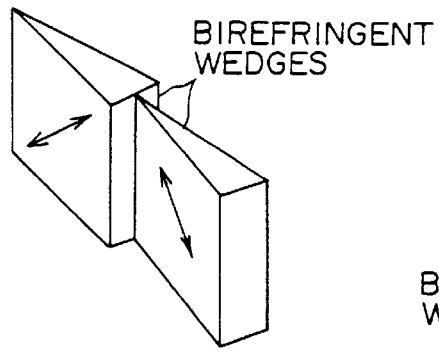
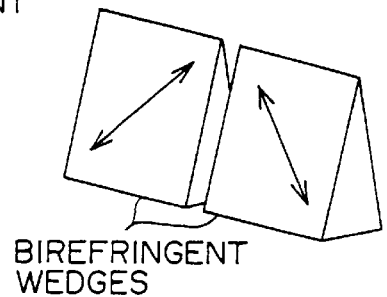
FIG. 7A   FIG. 7B
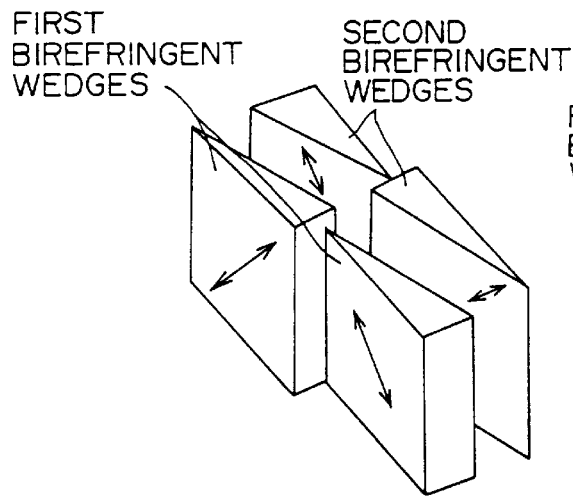
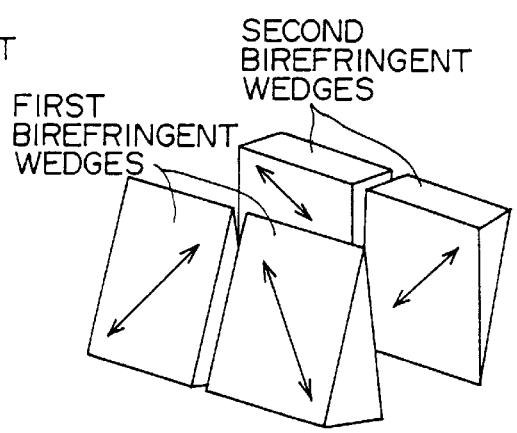
FIG. 7C   FIG. 7D
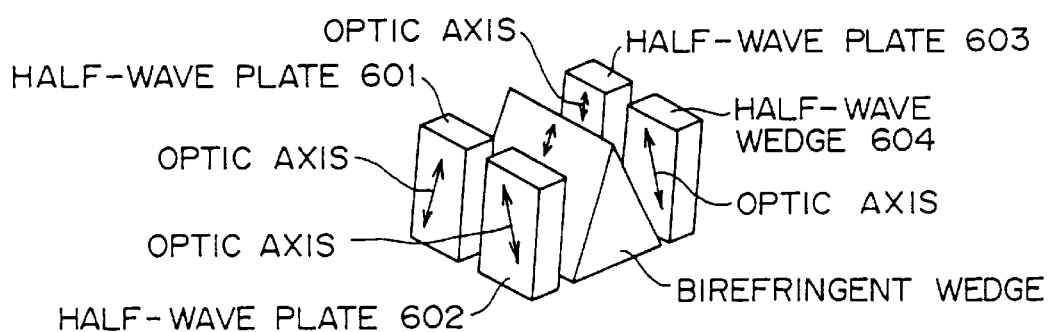
FIG. 7E

OPTICAL DEVICE

BACKGROUND OF THE INVENTION

1. Field of the Invention

The present invention relates to an optical device, and more particularly to an optical device implemented as an optical circulator and a magneto-optical switch.

2. Description of the Related Art

As interest in optical communication increases, the demand for an optical device of high performance, low price, and small size has become greater in recent years, in order to implement optical communications.

FIGS. 1A and 1B are schematic diagrams showing a conventional optical circulator or magneto-optical switch.

The optical circulator or the magneto-optical switch having a configuration similar to that of the optical circulator is implemented by using the non-reciprocal characteristics and inversion of magnetization of a 45-degree Faraday rotator. Basically, it is configured as shown in FIG. 1A.

The optical device shown in FIG. 1A comprises fibers 1006-1 through 1006-4 for inputting/outputting light, lenses 1005-1 through 1005-4 for collimating or focusing light, prisms 1001 and 1004 for splitting/combining light depending on a polarization state, a half-wave plate 1002 and a 45-degree Faraday rotator 1003, both of which are arranged between the prisms 1001 and 1004.

The prisms 1001 and 1004 split input light into two orthogonally-polarized components, and output the parallel beams along respective optical paths. A multilayer interference film is normally used as a means for splitting polarized light. The two prisms 1001 and 1004 are arranged facing each other, and the half-wave plate 1002 for reciprocally rotating a polarization plane by 45 degrees and the 45-degree Faraday rotator 1003 are inserted in between them. If the light proceeds from the fiber 1006-1 to the right in FIG. 1A, the rotation angles of the polarization planes of the polarized components split by the prism 1001 are rotated in the same direction by 45 degrees by both the half-wave plate 1002 and 45-degree Faraday rotator 1003, so that the total rotation angles are 45 degrees plus 45 degrees which equals 90 degrees. On the contrary, if the light proceeds from the optical fiber 1006-4 to the left, the polarization planes are rotated by 45 degrees by the 45-degree Faraday rotator 1003, and counter-rotated by 45 degrees by the half-wave plate 1002, so that the rotation angles are 45 degrees minus 45 degrees which equals 0. Accordingly, light from the fiber 1006-1 proceeds to the fiber 1006-4; light from the fiber 1006-4 proceeds to the fiber 1006-2; light from the fiber 1006-2 proceeds to the fiber 1006-3; and light from the fiber 1006-3 proceeds to the fiber 1006-1. In this way, the capability of the optical circulator can be implemented.

In the meantime, if the electromagnet of the 45-degree Faraday rotator is supplied with an electronic current thereby inverting its magnetization, the Faraday rotation angle is inverted. As a result, the light proceeding from the fiber 1006-4 to the fiber 1006-2, will proceed to the fiber 1006-1, thereby implementing the capability of the magneto-optical switch.

In this configuration, however, cross talk may occur due to the elliptical polarization caused by the 45-degree Faraday rotator, incompleteness of the splitting of the polarized light by the prism, etc. Normally, the amount of cross talk is approximately −25 to −30 dB.

To solve this problem, the optical circulator shown in FIG. 1B was proposed.

In the configuration shown in FIG. 1B, fibers 1010-1 through 1010-4 for inputting and outputting light are arranged, and lenses 1011-1 through 1011-4 collimate or focus the light. Birefringent crystals 1013 and 1014 are arranged so that they face the lenses 1011-1 through 1011-4. In addition, another birefringent crystal 1012 is arranged between the birefringent crystals 1013 and 1014. Half-wave plates 1016-1 through 1016-4 which are arranged in the respective optical paths, and 45-degree Faraday rotators 1015-1 and 1015-2 are inserted between the birefringent crystals 1012 and 1013, 1012 and 1014 respectively.

In FIG. 1B, light input from optical fiber 1010-1 or 1010-2 is split by the birefringent crystal 1013 according to the polarization, and two polarized beams whose polarization planes are orthogonal are polarization-rotated by the respective half-wave plates 1016-1 and 1016-2, so that they will be in the same orientation. After their polarization planes are rotated by the 45-degree Faraday rotator 1015-1, the beams are each refracted in particular directions by the birefringent crystal 1012, and these two polarized beams are again polarization-rotated by the respective half-wave plates 1016-3 and 1016-4, so that they become orthogonal. Then, after their polarization planes are rotated by the 45-degree Faraday rotator 1015-2, they are re-combined into a single beam by the birefringent crystal 1014, and output. Since the polarization direction of light in the central birefringent crystal 1012 differs by 90 degrees in the reverse direction, the light deviates from the optical path in the forward direction and becomes a different beam of light to be output. In this configuration, two non-reciprocal portions are included. Assuming that the cross talk caused by one of the non-reciprocal portions is one hundredth, the cross talk caused by passing through the two non-reciprocal portions will be one ten-thousandth. That is, the cross talk can be reduced significantly.

As described above, cross talk occurs due to the elliptical polarization caused by the 45-degree Faraday rotator and the incompleteness of the splitting of the polarized light by a prism, as in the configuration shown in FIG. 1A. Therefore, the amount of cross talk in FIG. 1B is doubled to approximately −50 to −60 dB, and this amount of cross talk exceeds that of an allowable range for practical use.

However, although the problem of cross talk is solved in the configuration shown in FIG. 1B, the number of components and their total size become large. As a result, the optical device itself becomes expensive.

SUMMARY OF THE INVENTION

The object of the present invention is to provide an optical device such as an optical circulator or a magneto-optical switch, connected to an optical fiber, which is easy to configure at low cost with the number of components, size, and amount of cross talk reduced.

The optical device according to the present invention comprises two polarizing prisms for splitting incident light into two linearly-polarized beams whose polarization planes are orthogonal, outputting the resultant beams along first and second optical paths parallel to each other, combining and outputting the input linearly-polarized beams as output light; two 45-degree Faraday rotators arranged between the polarizing prisms; and a deflecting unit, which is arranged between the two 45-degree Faraday rotators, for providing linearly-polarized beams in the first and second optical paths with a first deflection angle, and providing linearly-polarized beams orthogonal to the linearly-polarized beams in the first and second optical paths with a second deflection angle different from the first deflection angle.

A modification of the optical device according to the present invention comprises: a reflecting plane for reflecting light; a polarizing prism for splitting incident light into two linearly-polarized beams whose polarization planes are orthogonal, outputting the resultant beams along first and second optical paths parallel to each other, combining and outputting the two input linearly-polarized beams as output light; a 45-degree Faraday rotator arranged between the polarizing prism and the reflecting plane; and a deflecting unit, which is arranged between the 45-degree Faraday rotator and the reflecting plane, for providing linearly-polarized beams in the first and second optical paths with a first deflection angle, and providing linearly-polarized beams orthogonal to the linearly-polarized beams in the first and second optical paths with a second deflection angle different from the first deflection angle.

According to the present invention, the number of components can be reduced when configuring the optical circulator or the magneto-optical switch, thereby downsizing the entire device. Furthermore, two non-reciprocal portions each comprising one polarizing prism, one 45-degree Faraday rotator, and one deflecting unit are arranged in tandem, thereby reducing the cross talk.

In the modification, the number of polarizing prisms and 45-degree Faraday rotators can be further reduced from two to one, by adopting a reflecting plane. As a result, not only the number of components but the manufacturing cost can be reduced. Furthermore, light passes twice through the non-reciprocal portion including the polarizing prism, 45-degree Faraday rotator, and birefringent wedge, thereby also reducing the cross talk.

Still further, it is configured so that the deflecting unit provides linearly-polarized beams in the first and second optical paths with the first deflection angle, and provides linearly-polarized beams orthogonal to the linearly-polarized beams in the first and second optical paths with the second deflection angle different from the first deflection angle. Accordingly, if it is controlled to provide light input from a right side with the first deflection angle, and provide light incident from a left side with the second deflection angle using the 45-degree Faraday rotator, a light-receiving point at which the light from the right side is received will be different from a light-sending point from which the light from the left side is supplied in which the light from the left side is received where the light from the right side is supplied. In this way, an optical circulator can be implemented.

Still further, the direction of the rotation angle of the 45-degree Faraday rotator is inverted by inverting the magnetic field applied to the magneto-optical crystal of the 45-degree Faraday rotator, thereby providing light input from the right side of the optical device with the second deflection angle, and providing light input from the left side of the optical device with the first deflection angle. Thus, a light-receiving point at which input light is received can be switched, thereby implementing the capability of the magneto-optical switch.

BRIEF DESCRIPTION OF THE DRAWINGS

FIGS. 7A through 7E are schematic diagrams showing modifications to a birefringent wedge;

DESCRIPTION OF THE PREFERRED EMBODIMENTS

Figure 2:
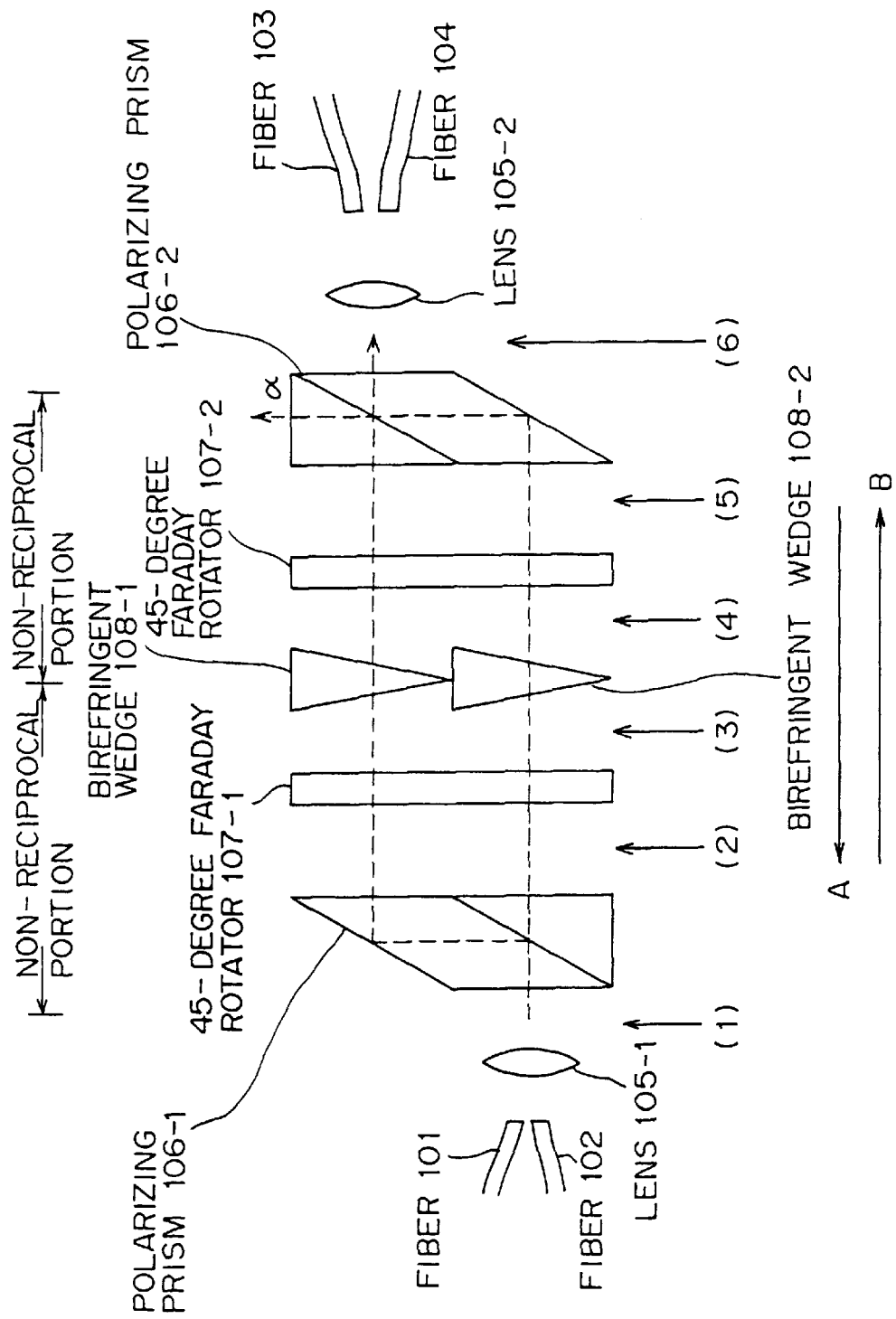
FIG. 2 is a schematic diagram showing a first embodiment of an optical device according to the present invention.

FIG. 2 is a schematic diagram showing the first embodiment of the optical device according to the present invention.

The optical device shown in this figure comprises fibers 101 through 104 for inputting/outputting light, lenses 105-1 and 105-2 for collimating/focusing the light input/output to/from the fibers 101 through 104, polarizing prisms 106-1 and 106-2 for splitting/combining orthogonally-polarized beams, 45-degree Faraday rotators 107-1 and 107-2 for rotating a polarization direction of light by 45 degrees, and birefringent wedges 108-1 and 108-2 for changing a deflection direction of light. Since two non-reciprocal portions are connected in tandem in the configuration as shown in FIG. 2, the square of the cross talk caused in either of the non-reciprocal portions will be the total cross talk of the two. Accordingly, if the cross talk caused in either of the non-reciprocal portions is one hundredth, the total cross talk will be one ten-thousandth. As a result, a configuration with reduced cross talk can be implemented.

Light input from the fiber 101 is collimated by the lens 105-1, and split into two linearly-polarized beams which are orthogonal by the polarizing prism 106-1. The respective split beams are output from the polarizing prism 106-1 along two parallel optical paths with the orthogonality of their polarization planes maintained. These beams pass through the 45-degree Faraday rotator 107-1, so that the respective polarization planes are rotated by 45 degrees. Each of the beams enters each of the birefringent wedges 108-1 and 108-2. The wedge angles of the birefringent wedges 108-1 and 108-2 are identical, but the directions of their optic axes are respectively parallel to the polarization planes of the linearly-polarized beams. That is, the directions of the optic axes of the birefringent wedges 108-1 and 108-2 form 90 degrees the forward direction of light. Since both of the polarized beams pass through the birefringent wedges 108-1 and 108-2 as extraordinary light, they are refracted as extraordinary light. As a result, they are still parallel after passing through the birefringent wedges 108-1 and 108-2. Since the polarization planes are orthogonal after passing through the 45-degree Faraday rotator 107-2, they are recombined into one beam by the polarizing prism 106-2. Both of the polarization components are focused onto the fiber 104 and output. If the rotation angles of the polarization planes of the two 45-degree Faraday rotators 107-1 and 107-2 are in the same direction at this time, the polarization planes are both rotated by 90 degrees. Note that the same capability as that of the polarizing prisms 106-1 and 106-2 can be implemented also by a birefringent plate.

In the meantime, light incident from the fiber 104 is collimated by the lens 105-2, and split into two linearly-polarized beams which are orthogonal by the polarizing prism 106-2. The respective resultant beams are output from the polarizing prism 106-2 along two parallel optical paths from the prism with the orthogonality of their polarization planes maintained. These beams pass through the 45-degree Faraday rotator 107-2, and their polarization planes are rotated by 45 degrees. Then, they respectively enter the birefringent wedges 108-1 and 108-2. Since the polarization planes of both of the beams are rotated by 90 degrees compared with the case where a light proceeds from the fiber 101 to the fiber 104, they are made ordinary in the birefringent wedges 108-1 and 108-2, and refracted as ordinary light. After passing through the 45-degree Faraday rotator 107-1, they are recombined into one beam by the polarizing prism 106-1. Because the beams are refracted by the birefringent wedges 108-1 and 108-2 as ordinary light in this case, its angle of travel is different from that of the light output from the fiber 101. Accordingly, it is focused onto the fiber 102. Similarly, light input from the fiber 102 enters the polarizing prism 106-1 from a direction somewhat different to that of the light output from the fiber 101. Therefore, it is output from the polarizing prism 106-2 at an angle different from that of the light output from the fiber 101, and focused onto the fiber 103. In this way, the capability of the optical circulator can be implemented.

The light output from the fiber 103 is focused onto neither the fiber 101 nor the fiber 102, and is output in a direction different to that of the fibers 101 and 102. Therefore, it is not a perfect optical circulator, but is enough as a circulator in practice if the above described function is realized.

Note that the polarizing prisms 106-1 and 106-2 can be formed by adhering a polarized-light splitting filter (multilayer interference filter) between two pieces of glass in the form of a prism. In addition, a single crystal of titanium dioxide or calcite can be used as the material for the birefringent wedges 108-1 and 108-2.

In the configuration shown in FIG. 2, the lens 105-1 is arranged for the fibers 101 and 102 in common, and the lens 105-2 is arranged for the fibers 103 and 104 in common. However, one lens may be arranged for each of the fibers. Furthermore, optical fibers 101 through 104 may be combined within a ferrule assembly.

The above provided explanation is based on the assumption that the Faraday rotation angles of the two 45-degree Faraday rotators rotate in the same direction. However, the Faraday rotation angles of the 45-degree Faraday rotators 107-1 and 107-2 may be intended to rotate in opposite directions. In this case, a beam output from the polarizing prism 106-1 and polarized orthogonally to the plane of the drawing of this figure, enters also the polarizing prism 106-2 as a beam polarized orthogonally to the plane of the figure, while a beam output from the polarizing prism 106-1 and polarized in parallel to the plane of the figure, also enters the polarizing prism 106-2 as a beam polarized in parallel to the plane of the figure.

Accordingly, the beam is output in a direction indicated by a in FIG. 2. A lens and fiber may be arranged to receive the beam at this point.

Figure 3A:
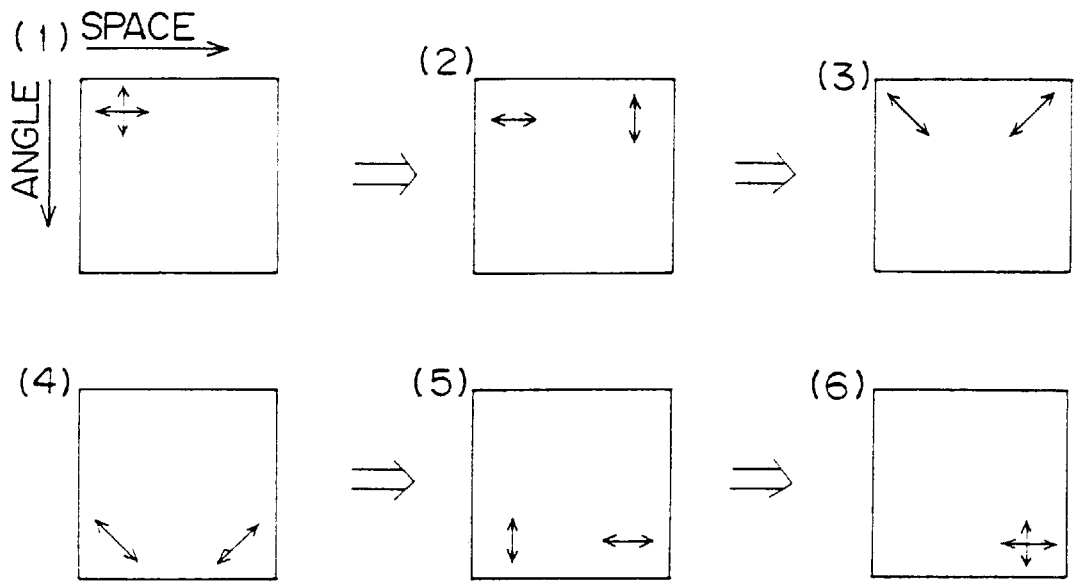
FIGS. 3A and 3B show cross sections of optical paths at stages indicated by the numbers in parentheses shown in FIG. 2, and the polarization directions of the light.
Figure 3B:
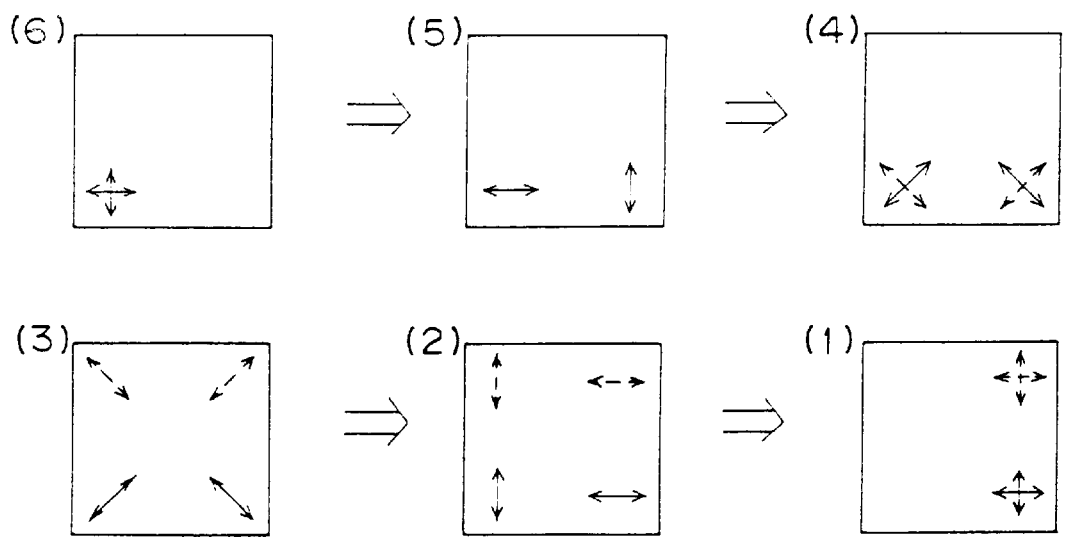
Figure 3C:
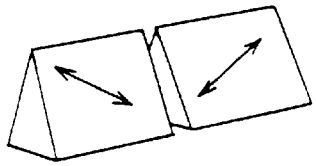
FIG. 3C shows the orientation of the birefringent wedges.

FIGS. 3A and 3B show cross sections at stages of the optical path indicated by the numbers in parentheses shown in FIG. 2, and the polarization directions of the light. The polarization directions of light indicate the polarization directions as seen from the propagating direction of light. That is, the polarization directions seen from the direction of an arrow A in FIG. 2 is indicated when the light propagates from the left to the right, while the polarizing directions as seen from the direction of an arrow B in FIG. 2 when the light propagates from the right to the left. In FIGS. 3A and 3B the birefringent wedges are arranged so that the apex of the wedges point upward as shown in FIG. 3C. Provided next is the explanation about these figures regarding the solid-line arrows. The explanation about these figures regarding the dotted-line arrows will be provided later.

(1) in FIG. 3A shows the propagating direction and polarization state of light input from the fiber 101 and collimated by the lens 105-1. As shown in (1), the light output from the fiber 101 contains polarized beam components which are orthogonal to each other.

When the beams shown in (1) pass through the polarizing prism 106-1, one of the orthogonally-polarized-beam components (the "p" component) continues straight, while the other of the two (the "s" component) is reflected and its optical path is changed. In the case shown in FIG. 3A, a horizontally-polarized beam continues straight and passes through the polarizing prism 106-1. Accordingly, the components polarized in vertical and horizontal directions proceed along different optical paths, as shown in (2).

The respective polarized beams split by the polarizing prism 106-1 pass through the 45-degree Faraday rotator 107-1, so that their polarization planes are rotated clockwise by 45 degrees as shown in (3) of FIG. 3A. Then, they pass through the birefringent wedges 108-1 and 108-2 respectively. Since the polarized beams shown in (3) of FIG. 3A pass as extraordinary light inside the birefringent wedges 108-1 and 108-2, they are significantly deflected and output from the birefringent wedges 108-1 and 108-2 as shown in (4), as compared with in the case of ordinary light.

The beams which pass through the birefringent wedges 108-1 and 108-2 then pass through the 45-degree Faraday rotator 107-2, so that their polarization planes are rotated clockwise by 45 degrees and output as beams which are horizontally and orthogonally polarized, as shown in (5). These beams are combined by the polarizing prism 106-2, and output from the polarizing prism 106-2 at an angle different from the angle of incidence in (1), as shown in (6) of FIG. 3A. It is received, for example, by the fiber 104.

On the contrary, the light output from the fiber 104 is input as the light containing vertically and horizontally polarized beams as shown in (6) of FIG. 3B. They are polarized and split by the polarizing prism 106-2 to become in the state as shown in (5) of FIG. 3B. Their polarization planes are rotated counterclockwise as shown in (4) of FIG. 3B by passing through the 45-degree Faraday rotator 107-2.

After passing through the 45-degree Faraday rotator 107-2, the beams are input to the birefringent wedges 108-1 and 108-2. Since beams input to the birefringent wedges 108-1 and 108-2 will pass through the birefringent wedges 108-1 and 108-2 as ordinary light at this time, as shown in (4) of FIG. 3B, they are output at an angle different from that in the case described by referring to FIG. 3A. Accordingly, the change of the angles seen from (3) to (4) in FIG. 3A is not seen from (4) to (3) in FIG. 3B. In practice the angles change, but the figures are intended to show the states as if there were no angle change. This is because the refraction difference between extraordinary and ordinary light can be seen clearly.

The beams output from the birefringent wedges 108-1 and 108-2 are input to the 45-degree Faraday rotator 107-1, and their polarization planes are rotated counterclockwise by 45 degrees to become in the state shown in (2) of FIG. 3B. Then, these orthogonal beams are combined by the polarizing prism 106-1, and output to the lens 105-1. As is evident from the comparison between (1) of FIG. 3A and (1) of FIG. 3B, the light output from the lens 105-1 is output at an angle different from that of the light input from the fiber 101 ((1) of FIG. 3A). Accordingly, the light shown in (1) of FIG. 3B is received by the fiber 102, different from the fiber 101.

In this way, the light input from the fiber 101 proceeds to the fiber 104, while the light input from the fiber 104 proceeds to the fiber 102. Thus, an optical circulator can be implemented according to the configuration shown in FIG. 2.

Figure 4:
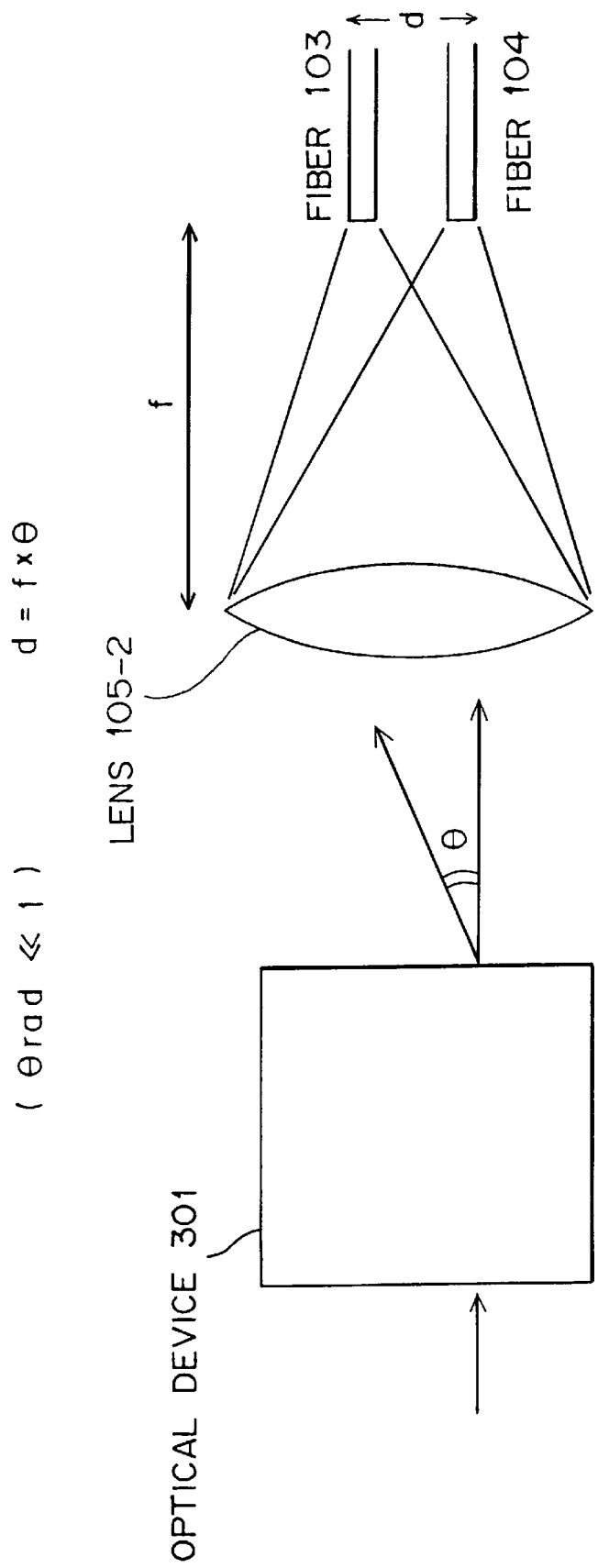
FIG. 4 is a schematic diagram showing a disposition relationship between fibers 103 and 104 which respectively receive beams of light output from the optical device shown in FIG. 2 at different angles.

FIG. 4 is a schematic diagram showing a disposition relationship between the fibers 103 and 104 which respectively receive light output at different angles from the optical device shown in FIG. 2.

With the optical device shown in FIG. 2, light input from the fibers 101 and 102 are output at different angles from the polarizing prism 106-2. For example, if the birefringent wedges are arranged as shown in FIG. 3C, the fibers 103 and 104 will be arranged orthogonally to the plane of the drawing of FIG. 4.

In FIG. 4, the optical device 301 indicates the portion composed of the polarizing prisms 106-1 and 106-2, 45-degree Faraday rotators 107-1 and 107-2, and birefringent wedges 108-1 and 108-2, shown in FIG. 2.

Assuming that an angle formed by two beams proceeding in two different directions output from the optical device 301, is "θ", and the focal length of the lens 105-2 is "f", an interval "d" between the fibers 103 and 104 arranged for respectively receiving the beams proceeding in different directions, is represented by d=f×θ. Here, the angle "θ" is defined in radians, which are much smaller than "1".

The fibers 103 and 104 are arranged at an interval "d" which allows the beams whose proceeding directions are different by θ radian to be focused by the lens 105-2 and received by the respective fibers 103 and 104.

Figure 1A:
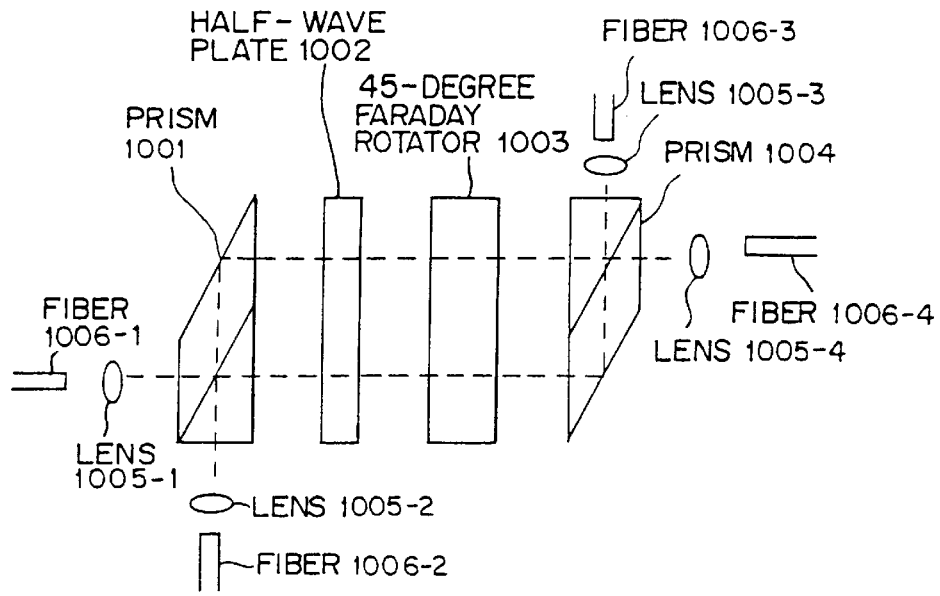
FIGS. 1A and 1B are schematic diagrams showing a conventional optical circulator or magneto-optical switch.
Figure 1B:
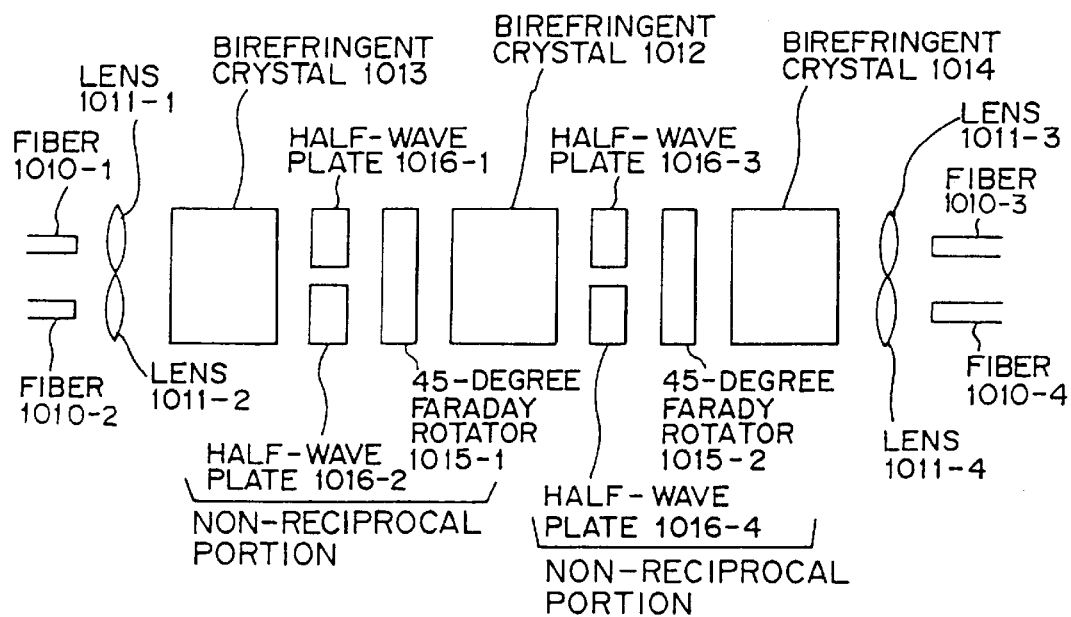

According to the present invention as described above, the proceeding directions of the beams whose polarization states are different are deflected at different angles by using the birefringent wedges 108-1 and 108-2, unlike the conventional optical device of FIG. 1B which spatially changes an optical path of light passing through the optical device 301.

Figure 5A:
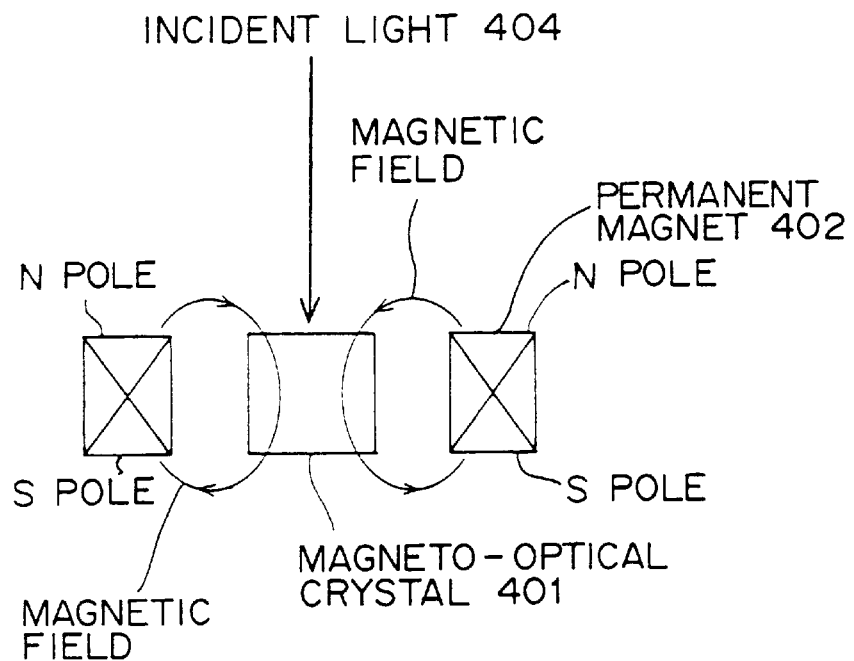
FIGS. 5A and 5B are schematic diagrams showing the implementation of a 45-degree Faraday rotator for use in the optical devices shown in FIG. 2.
Figure 5B:
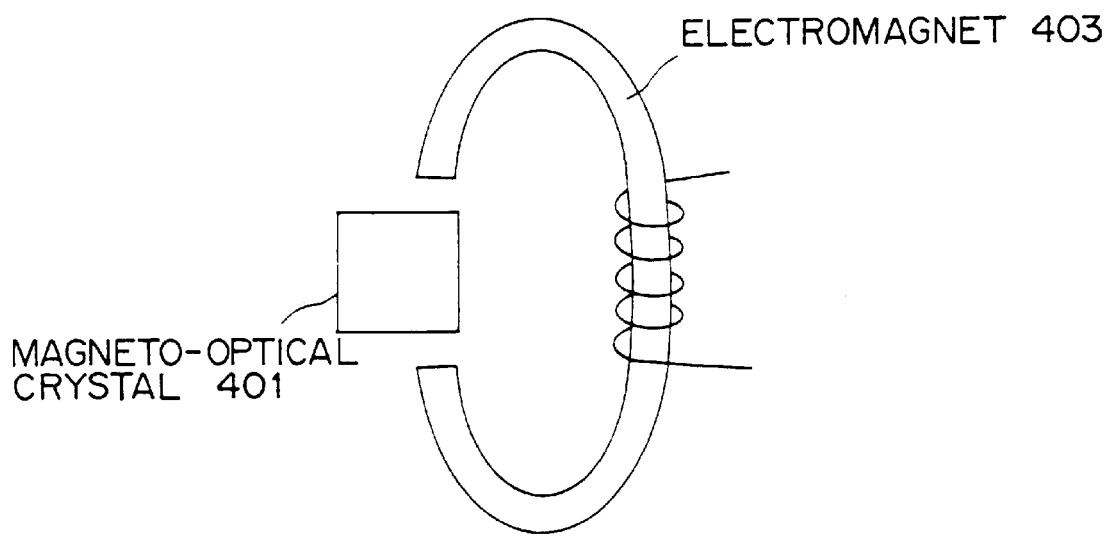

FIGS. 5A and 5B are schematic diagrams showing the configuration of the 45-degree Faraday rotator for use in the optical device shown in FIG. 2.

The 45-degree Faraday rotator is implemented by, for example, magnetizing a magneto-optical crystal 401 using permanent magnets 402 as shown in FIG. 5A. The Faraday rotation angle is fixed in this case. In the configuration shown in FIG. 5A, the poles of the two permanent magnets 402 are arranged so that magnetic fields parallel to the direction of input light 404 are applied to the magneto-optical crystal 401, thereby obtaining a 45-degree Faraday rotation angle. Since the rotation angle of such a 45-degree Faraday rotator is fixed, the capability of the optical circulator will be limited.

However, the rotation angle may be changed by configuring the Faraday rotator with an electromagnet 403 as shown in FIG. 5B. In this case, the rotation angle can be inverted by inverting the direction of the electric current flowing in the electromagnet 403, which leads to inverting the direction of the magnetic field applied to the magneto-optical crystal. When the rotation angle is inverted, beams polarized as ordinary and extraordinary light inside a birefringent wedge are exchanged. As a result, a fiber receiving the beam is switched and the device serves as a magneto-optical switch.

That is, beams of light input from the fiber 104 are polarized orthogonally to the polarized beams shown in (4) of FIG. 3B, and pass through the birefringent wedges 108-1 and 108-2 as extraordinary light in the direction of (4) to (3) in FIG. 3B. Therefore, they become the state indicated by the dotted-line arrows in (3) in FIG. 3B. Since the beams are output at angles indicated by dotted-line arrows in (1) in FIG. 3B, the beams are output not to fiber 102, but to fiber 101 in FIG. 2.

Thus, light input from one fiber can be output to a different fiber by inverting the rotation angles of the 45-degree Faraday rotators 107-1 and 107-2, thereby utilizing the optical device as a magneto-optical switch.

The electromagnet 403 shown in FIG. 5B may be composed of a coil and a soft magnetic material, or of a coil and a semi-hard magnetic material as a self-holding switch. In the configuration shown in FIG. 2, two non-reciprocal portions are used for the optical circulator and magneto-optical switch, thereby reducing cross talk.

Figure 6A:
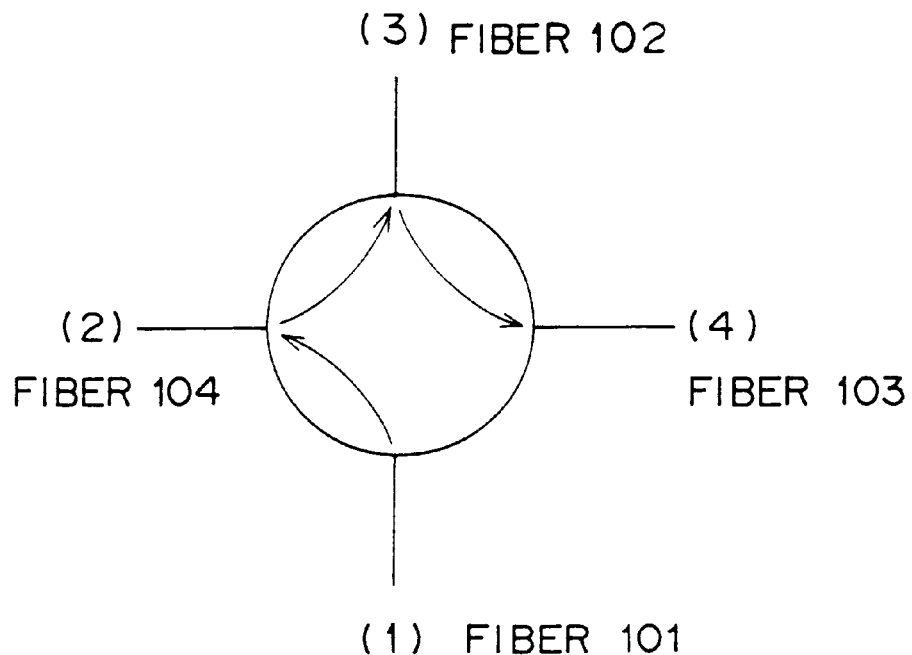
FIGS. 6A and 6B are schematic diagrams explaining the concept of an optical circulator and a magneto-optical switch to which the optical circulator is applied.
Figure 6B:
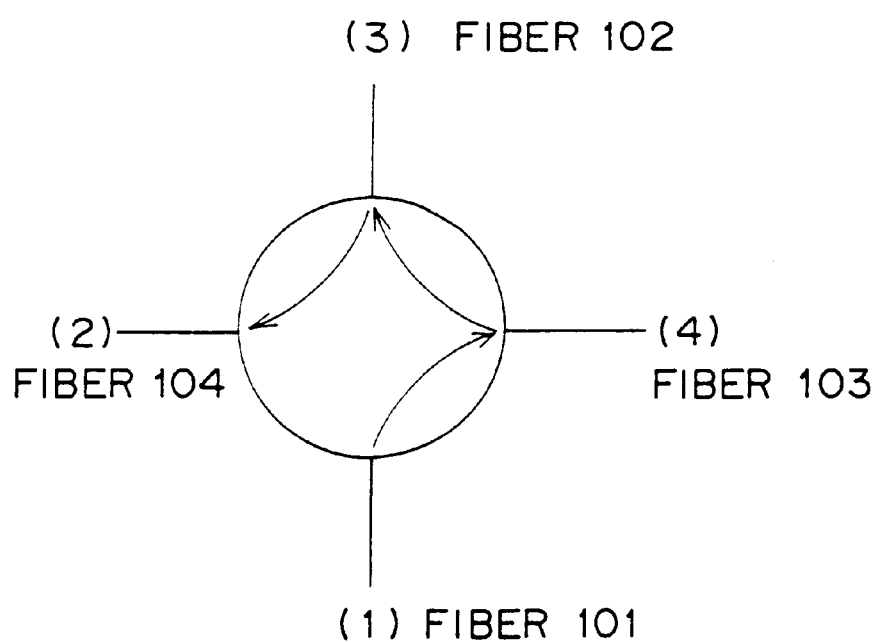

FIGS. 6A and 6B are schematic diagrams showing the concept of an optical circulator and a magneto-optical switch to which the optical circulator of the present invention is applied.

As shown in FIG. 6A, an input/output relationship of light is switched to start circulating from (1). That is, light output from (1) is input to (2); light output from (2) is input to (3); and light output from (3) is input to (4). Here, assuming that (1) corresponds to the fiber 101 shown in FIG. 1, (2), (3), and (4) correspond to the fibers 104, 102, and 103 respectively.

If the rotation angle of the 45-degree Faraday rotator is inverted as described above, the lights input from the same input optical fibers are output to different optical fibers.

That is, the light output from (1) is input to (4) as shown in FIG. 6B. Similarly, the light output from (4) is input to (3), and the light output from (3) is input to (2). It means that the optical paths are changed to a direction opposite to that shown in FIG. 6A. Accordingly, if the light is output from (1), the direction of this light can be changed from (2) to (4) by inverting the rotation angle of the 45-degree Faraday rotator. As described above, a magneto-optical switch with the same configuration as the optical circulator can be implemented by simply allowing the 45-degree Faraday rotator to invert its rotation angle.

FIGS. 7A through 7E show modifications to a birefringent wedge assembly.

For a birefringent wedge, the direction in which it deflects a light may be parallel or orthogonal to a plane containing two parallel beams, or may be arbitrary. FIGS. 7A and 7C show examples of birefringent wedges whose deflection directions are parallel, while FIGS. 7B and 7D show examples of birefringent wedges whose deflection directions are orthogonal. In FIGS. 7A through 7E, each arrow indicates the direction of an optic axis of each birefringent wedge.

In FIGS. 7A and 7B, the wedge angles of the birefringent wedges are the same, but their optic axes are inclined at +45 degrees and −45 degrees respectively. In the meantime, birefringent wedges of opposite orientation and with orthogonal optic axes are included in respective optical paths in FIGS. 7C and 7D in addition to the birefringent wedges in FIGS. 7A and 7B. Refraction caused by the first birefringent wedge is normally cancelled by the refraction caused by the next birefringent wedge. The average direction of two beams whose polarization planes are different after passing through the two birefringent wedges, is the same as that prior to passing through the birefringent wedges, while the split angle is changed by deflection.

Here, the average direction of two beams indicates the direction of a bisector of an angle formed by the two beams of light, which becomes identical to that prior to passing through the birefringent wedges. That is, the proceeding direction of the light output from the polarizing prism 106-2 shown in FIG. 2, spreads at the same angle on both sides of FIG. 2 in the direction indicated by the dotted line arrow of FIG. 2.

FIG. 7E shows another example of a modification to the birefringent wedge. In particular, this example adopts half-wave plates. With the configuration shown in FIG. 7E, the birefringent wedge is composed of one wedge having a vertical optic axis. In this case, the direction of the optic axis may be either vertical or horizontal, and the birefringent wedge depicted as one birefringent wedge plate may be composed of two birefringent wedges having their optic axes in the same direction.

In this configuration, half-wave plates whose principal axes are inclined at 22.5 degrees from the vertical are included in the paths of respective beams split by a polarizing prism, in addition to the birefringent wedge, in order to obtain the desired capability. For the half-wave plates, one of the principal axes which are orthogonal to each other will be the optic axis. For example, half-wave plates 601 and 602 have principal axes which are respectively inclined at 22.5 degrees from the vertical in opposite directions. The principal axes of half-wave plates 603 and 601 are inclined at 22.5 degrees in the same direction, and the principal axes of the half-wave plates 604 and 602 are also inclined at 22.5 degrees in the same direction, and the half-wave plates 603 and 604 counter-rotate the polarization planes rotated by the half-wave plates 601 and 602. Although the number of constituent elements becomes larger, such a configuration can perform the same function as that of the birefringent wedges shown in FIG. 7A and FIG. 7B.

Figure 8A:
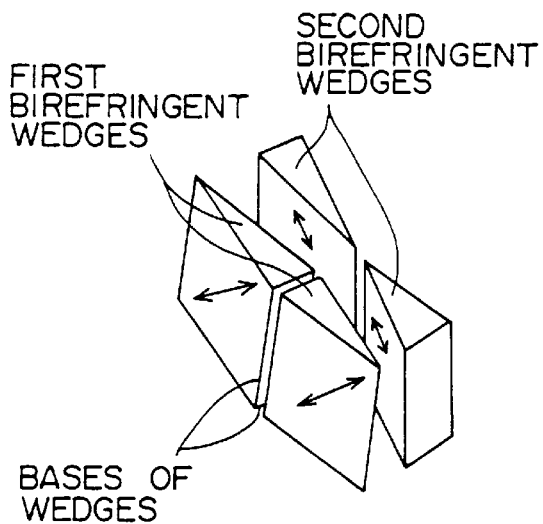
FIGS. 8A through 8E are schematic diagrams showing further modifications to the birefringent wedge.

FIGS. 8A through 8E are schematic diagrams showing other modifications to the birefringent wedge. FIG. 8A shows a modification of the birefringent wedge where the directions of the wedges are opposed. Opposed directions of the wedges indicates the state where the apex of the wedges face each other, or the state where the bases of the wedges face each other. The condition where the wedge angles have mutually opposite signs refers to such states.

Also with such a configuration, the average refraction angle of ordinary and extraordinary light can agree with a direction from which the light enters the corresponding birefringent wedges. In this case, the sign of the wedge angle of the first birefringent wedge is opposite to that of the wedge angle of the second birefringent wedge, but their angles are the same. The direction of the optic axes of the two first birefringent wedges are the same, while the directions of the optic axes of the two second birefringent wedges are orthogonal to the optic axes of the first birefringent wedges.

Figure 8B:
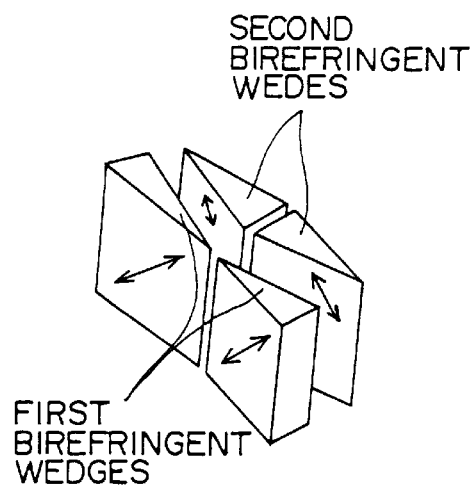

FIG. 8B shows the configuration where the locations of the first and second birefringent wedges shown in FIG. 8A are exchanged. Also in such a configuration, the proceeding direction of light refracted by the first birefringent wedge may be corrected by the second birefringent wedges, so that the average refraction angle of ordinary and extraordinary light can agree with an input direction of the light.

Figure 8C:
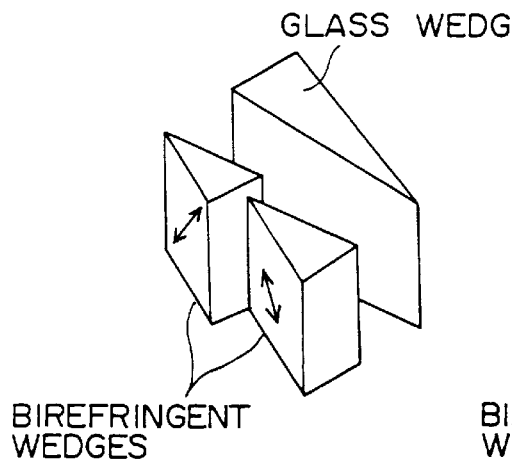

Furthermore, as shown in FIG. 8C, the average beam direction after passing through the birefringent wedges can also agree with the incidence direction of light by replacing the second birefringent wedges with a wedge made of an isotropic material such as glass, etc. in FIGS. 7C, 7D, 8A, and 8B. When a glass wedge is used, there is no orientation problem such as with the optic axis of a crystal. Therefore, there is no need to arrange wedges respectively for two optical paths. That is, it is sufficient to use only one glass wedge as shown in FIG. 8C. Also, glass wedges may be arranged for the respective individual optical paths. In this case, the wedge angle of the glass wedge must be larger by the ratio of the average refractive index of the birefringent wedges to the refractive index of the glass wedge, and the orientation of the glass wedge must be opposite to the birefringent wedges, as shown in FIG. 8C. When the orientation of the birefringent wedges and that of the glass wedge are opposite as described above, it is defined that the signs of the wedge angle of the birefringent wedges and the wedge angle of the glass wedge are opposite.

Figure 8D:
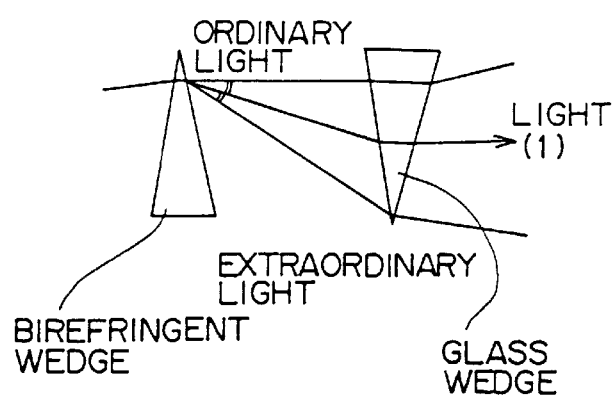

FIG. 8D shows a relationship between a wedge angle of glass wedge and that of a birefringent wedge.

The angles of refraction of a birefringent wedge for ordinary and extraordinary beams are different. Accordingly, the refractive index of the birefringent wedge also varies depending on whether it is the ordinary beam or the extraordinary beam which passes through a birefringent wedge. Assuming that a certain beam of light is deflected at the average of the refractive indices of the ordinary and extraordinary beams in a birefringent wedge, this beam proceeds to an optical path in the middle of the optical paths to which the extraordinary and ordinary beams proceed respectively.

In the meantime, if the refractive index of the glass wedge is equal to the above described average of the refractive indices of the birefringent wedges, the wedge angle of the glass wedge may be the same as that of a birefringent crystal. However, if the refractive index of the glass wedge is smaller than the average of the refractive indices, the optical path of the light (1) does not become parallel to the proceeding direction of light incident on the birefringent wedge, without increasing the wedge angle of the glass wedge. Accordingly, the wedge angle of the glass wedge needs to be increased in order to make the optical paths parallel. As described above, the angle of the glass wedge is determined by the ratio of the average of the refractive indices of the ordinary and extraordinary beams in the birefringent wedge to the refractive index of the glass wedge. Thus, the angle of separation between the extraordinary and ordinary beams can be made symmetrical with respect to the direction of incidence of the light.

Since an optical path may be deflected by a wedge as described above, separate beams can be received by respective fibers. Especially, if parallel beams whose directions are slightly different are collected into one lens, the focus points become different. Therefore, they are received by fibers arranged at the respective focus points.

Figure 8E:
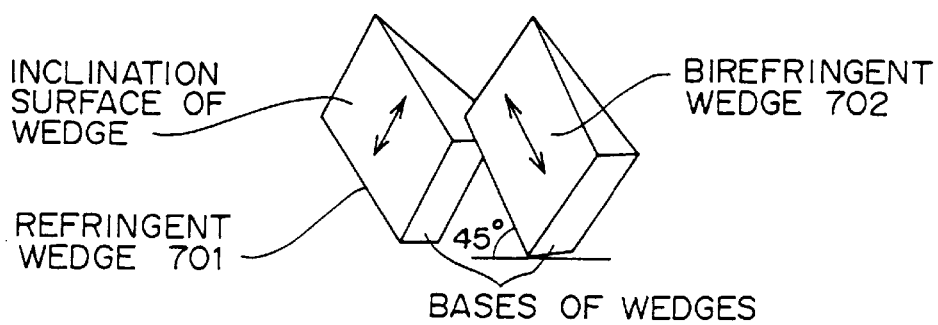

FIG. 8E shows another configuration of the birefringent wedges.

In this figure, birefringent wedges 701 and 702 are arranged by being inclined at 45 degrees from the horizontal. The optic axis of the birefringent wedge 701 indicated by an arrow shown in FIG. 8E is arranged to be parallel to the base of the wedge, while the optic axis of the birefringent wedge 702 is arranged to be orthogonal to the base of the wedge.

Normally, when light enters a birefringent wedge, its angle of incidence is not exactly orthogonal to the inclined plane of the wedge. However, if the optic axis is orthogonal or parallel to a plane containing the normal of the inclined plane of the wedge and the incidence direction of light, the polarization and splitting of the light can be realized even if the light is not incident orthogonally. In FIG. 8E, the optic axis of the birefringent wedge 701 is orthogonal to the plane containing the normal of the inclined plane of the wedge and the incidence direction of light, while the optic axis of the birefringent wedge 702 is parallel. Accordingly, the polarization directions of light passing through the birefringent wedges 701 and 702 as extraordinary or ordinary light become parallel to each other on the inclined plane of the birefringent wedges 701 and 702. Accordingly, cross talk which is produced by the light passing through the birefringent wedges can be reduced. Under ideal circumstances, the cross talk could be eliminated.

The above described configuration employs two Faraday rotators. However, one Faraday rotator may be used to work twice by reflecting the light back through it.

Figure 9:
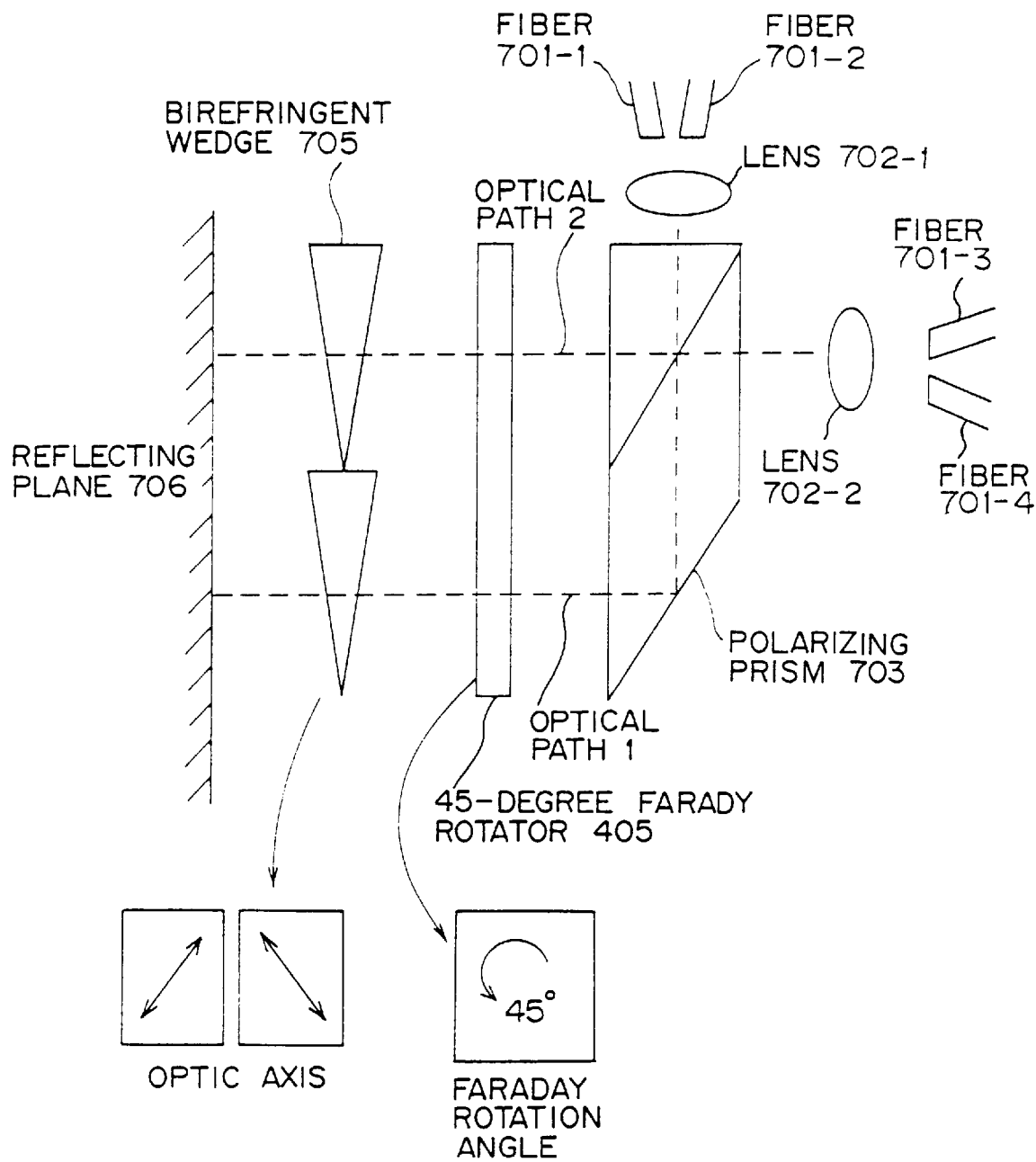
FIG. 9 is a schematic diagram showing a second embodiment of the optical device according to the present invention.

FIG. 9 is a schematic diagram showing the second embodiment of the optical device according to the present invention.

This device is composed of a reflecting plane 706, birefringent wedge 705, 45-degree Faraday rotator 704, polarizing prism 703, lenses 702-1 and 702-2, and fibers 701-1 through 701-4.

Light input from the fiber 701-1 is collimated by the lens 702-1, and input to the polarizing prism 703. In the polarizing prism 703, the light is split into polarized beams of light which are orthogonal to each other. The beam whose polarization direction is parallel to a plane of the drawing of this figure follows optical path 1, while the beam whose polarization direction is orthogonal to the plane of the drawing follows an optical path 2. Next, the respective beams are rotated counterclockwise by 45 degrees by the Faraday rotator 704, as shown at the bottom of FIG. 9. In this way, the polarization planes of the beams in the optical paths 1 and 2 are made parallel to the optic axes of the birefringent wedges 705 shown at the bottom of FIG. 9, and are refracted as extraordinary light. The beams output from the birefringent wedges 705 are reflected by the reflecting plane 706, and again refracted by the birefringent wedges 705 as extraordinary light. Then, the polarization planes are further rotated by 45 degrees by the Faraday rotator. The beam in the optical path 1 now has a polarization direction perpendicular to the plane of the figure, while the beam in the optical path 2 now has a polarization direction parallel to the plane of the figure. The beams are input to the polarizing prism 703. Thus, the beams passing along the optical paths 1 and 2 are combined, output to the lens 702-2, and received by the fiber 701-4.

In the meantime, a beam of light output from the fiber 701-4 is collimated by the lens 702-2, and split by the polarizing prism 703. In this case, a polarized beam vertical to the plane of the figure follows the optical path 1, while a polarized beam parallel to the plane of the figure follows the optical path 2. They become orthogonal to the optic axes of the birefringent wedges 705 after being rotated by the 45-degree Faraday rotator, and refracted as ordinary light. They are further refracted by the birefringent wedges 705 after being reflected by the reflecting plane 706. Then, their polarization planes are rotated by the 45-degree Faraday rotator 704. As a result, a polarized beam parallel to the plane of the figure follows the optical path 1, while a polarized beam orthogonal to the plane of the figure follows in the optical path 2. These beams are output to the lens 702-1, and input to the fiber 701-2.

The light output from the fiber 701-2 undergoes an operation similar to that of the light output from the fiber 701-1. However, since the locations of the fibers 701-1 and 701-2 are different, it is output from the lens 702-2 at an angle different from that of the light output from the fiber 701-1, and accordingly is focused onto the fiber 701-3.

As described above, the configuration shown in FIG. 9 can provide an operation similar to that of the optical device shown in FIG. 2, thereby implementing the capabilities of both the optical circulator and magneto-optical switch.

For the configuration shown in FIG. 9, the explanation where the reflecting plane 706 is separately arranged was provided. However, the reflecting plane 706 may be incorporated into each of the birefringent wedges 705. For example, a reflecting film can be arranged on one of the planes of both the birefringent wedges 705.

Figure 10:
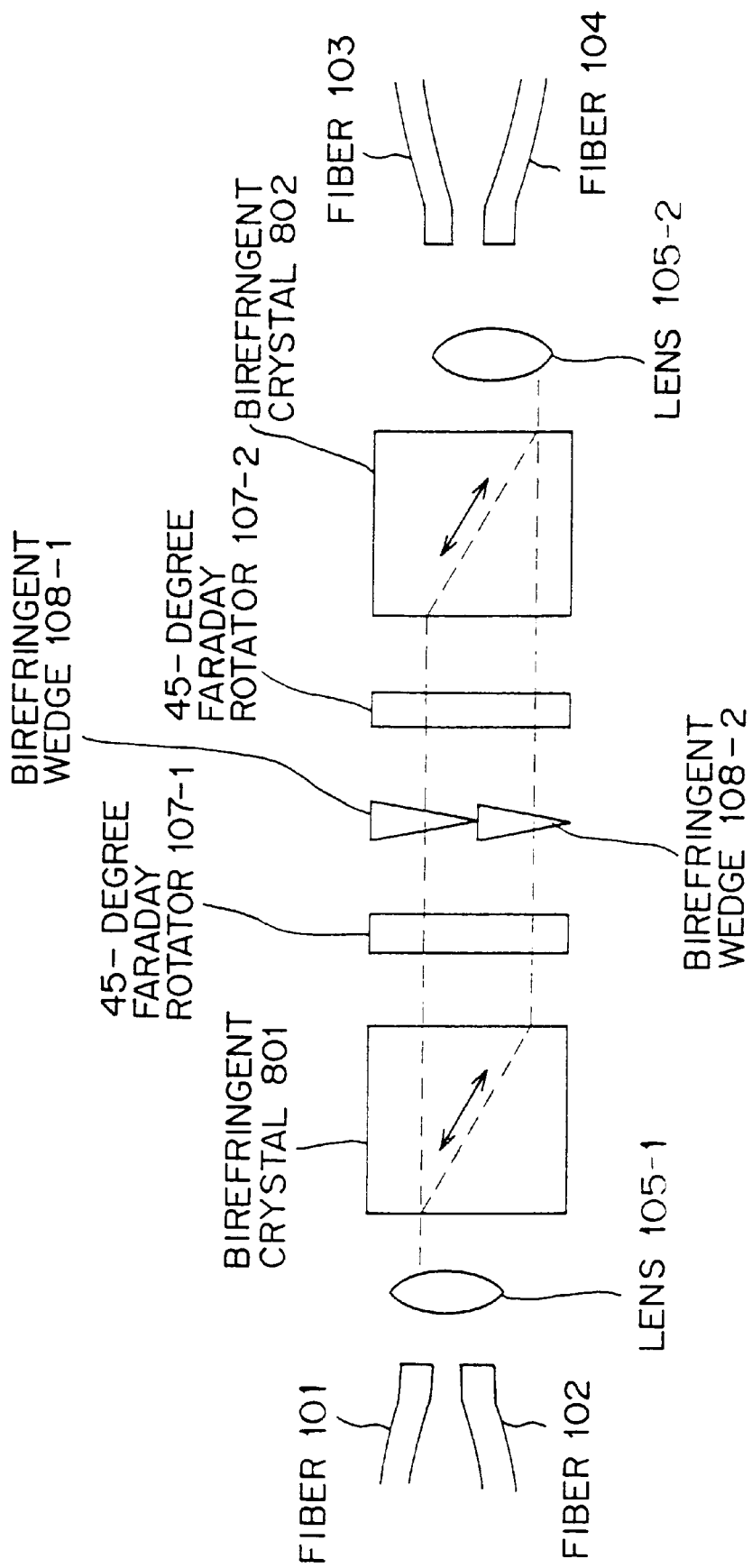
FIG. 10 is a schematic diagram showing a third embodiment of the optical device according to the present invention.

FIG. 10 is a schematic diagram showing the third embodiment of the optical device according to the present invention.

In this figure, the same constituent elements as those shown in FIG. 2 are denoted by the same reference numerals. In FIG. 10, birefringent crystals 801 and 802 are arranged instead of the polarizing prisms in FIG. 2. Light output from the fiber 101 or 102 is split into extraordinary and ordinary beams whose polarization planes are orthogonal to each other, by the birefringent crystal 801 as indicated by the dotted lines. The beams having the orthogonal polarization planes become parallel after passing through the birefringent crystal 801. Then, their polarization planes are rotated 45 degrees by the Faraday rotator 107-1, and the beams enter the birefringent wedges 108-1 and 108-2 as extraordinary light. They are refracted by the birefringent wedges 108-1 and 108-2 as extraordinary light, and their polarization planes are further rotated by the 45-degree Faraday rotator 107-2. As a result, they are converted into a polarized beam orthogonal to the plane of the drawing of this figure and a polarized beam parallel to the plane of the drawing. Then, they are input to the birefringent crystal 802, so that the orthogonally polarized beams are combined and output to the lens 105-2.

Whether the output light enters either the fiber 103 or the fiber 104 depends on from which of the fibers 101 and 102 the light is output from. For example, light output from the fiber 101 is input to the fiber 104, and light output from the fiber 102 is input to the fiber 103. Since there is a gap between the locations of the fibers 101 and 102 as described above, the direction to which the light refracted by the birefringent wedge 108-1 is output through lens 105-2 becomes different.

FIGS. 11A through 11D are schematic diagrams explaining the preferable configurations of birefringent wedges.

The above described embodiment refers to the configuration of the birefringent wedges whose apexes are oriented horizontally, while FIGS. 11A through 11D refer to the configuration in which the apexes of the birefringent wedges face upward in the drawing, as shown in FIG. 7B.

Figure 11A:
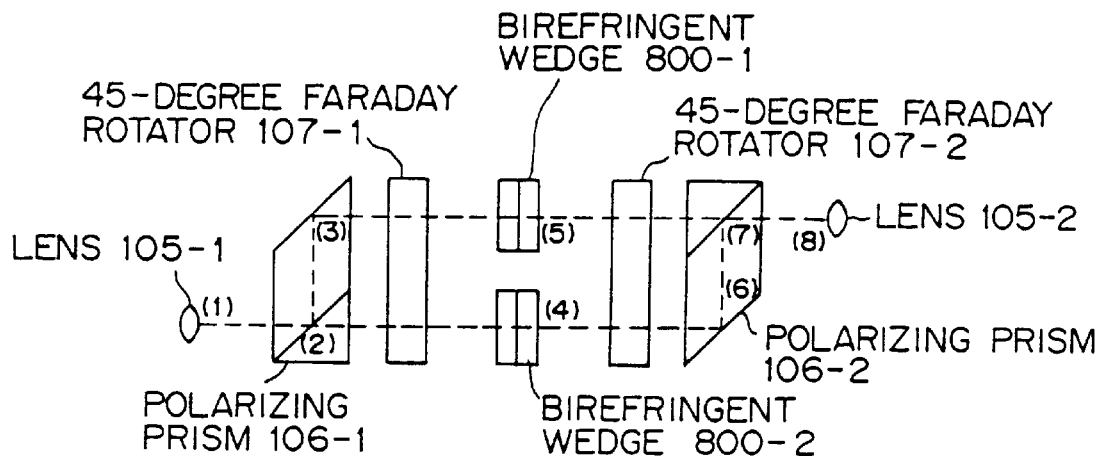
FIGS. 11A through 11D are schematic diagrams showing the paths of two linearly-polarized beams.

In the above described embodiment, the birefringent wedges 800-1 and 800-2 are arranged side by side as shown in FIG. 11A. With such an arrangement, the lengths of optical paths from the lens 105-1 shown in FIG. 11A to the respective birefringent wedges 800-1 and 800-2 become different. Similarly, the lengths of the optical paths from the birefringent wedges 800-1 and 800-2 to the lens 105-2 come to differ. That is, the distance of the optical path (1)-(2)-(4) becomes different from that of the optical path (l)-(2)-(3)- (5), by the portion of the optical path (2)-(3). Similarly, the distance of the optical path (5)-(7)-(8) becomes shorter than that of the optical path (4)-(6)-(7)-(8), by the portion of (6)-(7).

Light input from the lens 105-1 propagates the optical path (1)-(2)-(4) or the optical path (1)-(2)-(3)-(5), reaches the respective birefringent wedges 800-1 and 800-2, and is refracted. In FIG. 11A, the light is refracted downward in the drawing. Originally, after the light output from the lens 105-1 propagates the two optical paths as two beams, and are combined at the polarizing prism 106-2, they must be again input to the lens 105-2 as one beam. However, the two beams are not combined into one when they enter the lens 105-2 in the configuration shown in FIG. 11A, because the lengths of the optical paths from the birefringent wedges 800-1 and 800-2 are different from each other. They enter the lens 105-2 as two split beams.

Figure 11B:
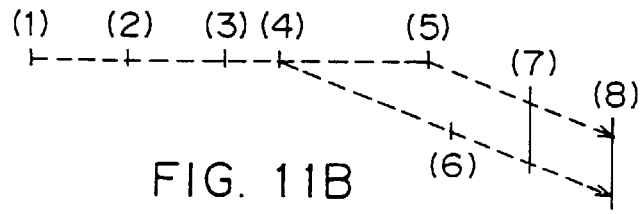

FIG. 11B explains this phenomenon. This figure depicts the optical paths (1)-(2)-(4)-(6)-(7)-(8) and (1)-(2)-(3)-(5)- (7)-(8) together for ease of understanding. With the configuration shown in FIG. 11B, one of the beams output from (1) is refracted at (4), while the other is refracted at (5). That is, the distances of the two optical paths from (1) to the respective birefringent wedges 800-1 and 800-2 are different in FIG. 11A. When the beams are refracted at the birefringent wedges 800-1 and 800-2, the distances to the position of the lens 105-2, that is, (8), are different as is evident from FIG. 11B. Therefore, even if the beams are refracted at the same angle at (4) and (5), they are not combined into one when they reach (8). They are yet the two beams. This is because the distance from the birefringent wedge 800-1 to the lens 105-2 is different from that from the birefringent wedge 800-2 to the lens 105-2. With the preferable configuration of the birefringent wedges 800-1 and 800-2 shown in FIG. 11C, the respective distances from the lens 105-1 to the birefringent wedges 800-1 and 800-2, are made equal. With such a configuration, the distances from the respective birefringent wedges 800-1 and 800-2 to the lens 105-2 become equal at the same time. That is, the distances of the optical paths (10)-(11)-(13) and (10)-(11)-(12)-(14), and the distances of the optical paths (13)-(15)-(16)-(17) and (14)- (16)-(17) become equal.

Accordingly, the beams are refracted by the birefringent wedges 800-1 and 800-2 at the same angle, and propagate the same distance to the lens 105-2. Therefore, they enter the same point of the lens 105-2 at the same angle. FIG. 11D explains this phenomenon.

Since the respective distances from (10) to (13) and (14), the respective distances from (13) or (14) to (17) become equal as shown in FIG. 11D, both of the beams refracted at the same angle reach the same point of (17). Accordingly, one beam input from the lens 105-1 is input as one beam also when it enters the lens 105-2.

Figure 11C:
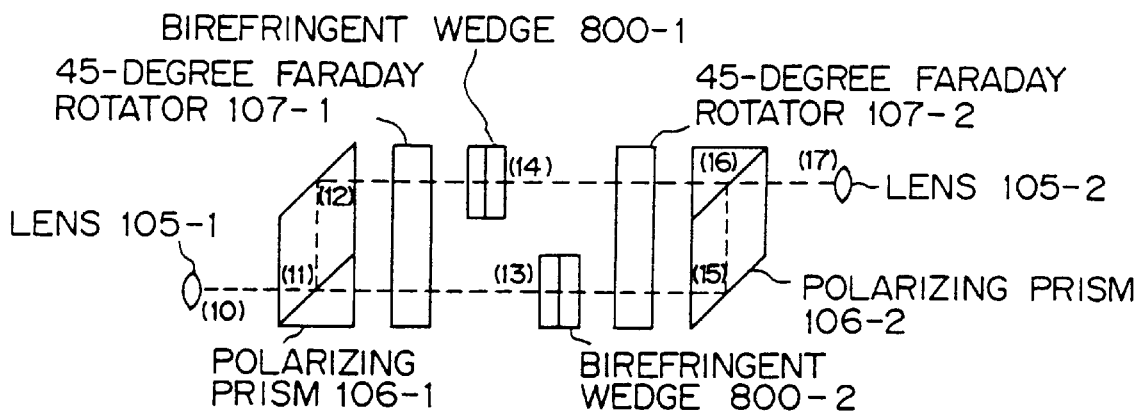
Figure 11D:
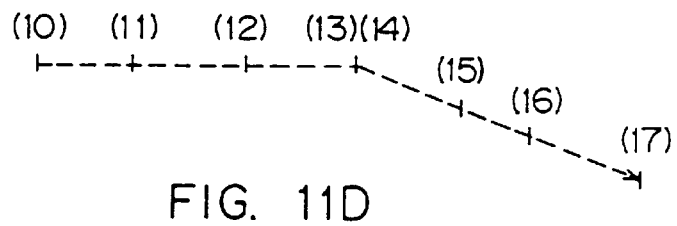

Therefore, the birefringent wedges 800-1 and 800-2 are spaced evenly from the respective lenses 105-1 and 105-2 as shown in FIG. 11C, in order to configure the optical device according to the present invention. Note that, however, the birefringent wedges 800-1 and 800-2 must be arranged in consideration of the thickness of the prism which seems to be approximately 1/(refractive index of the prism) due to the refraction of the prism, when the beams pass through the polarizing prisms 106-1 and 106-2.

Figure 12A:
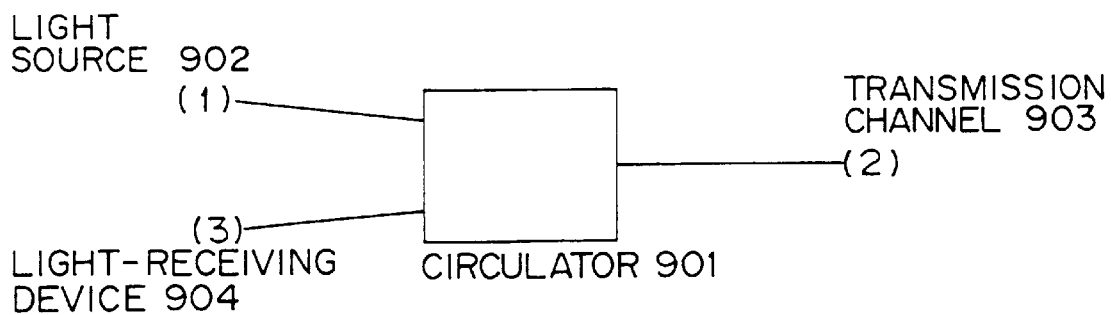
FIGS. 12A through 12C are schematic diagrams showing application of the optical device as the optical circulator according to the present invention.
Figure 12B:
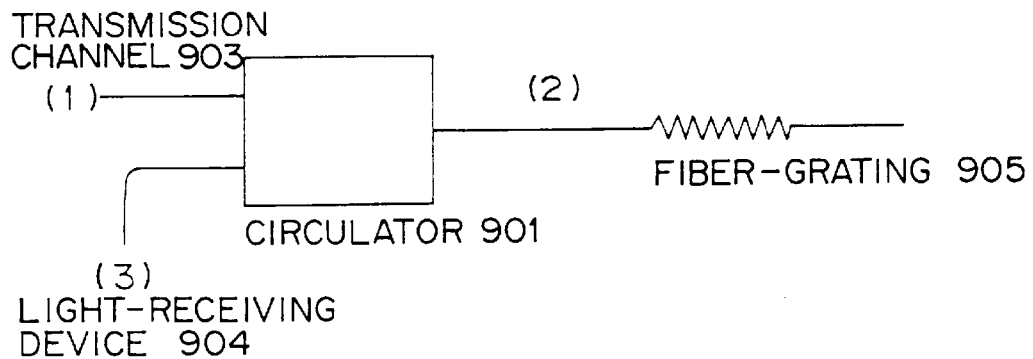
Figure 12C:
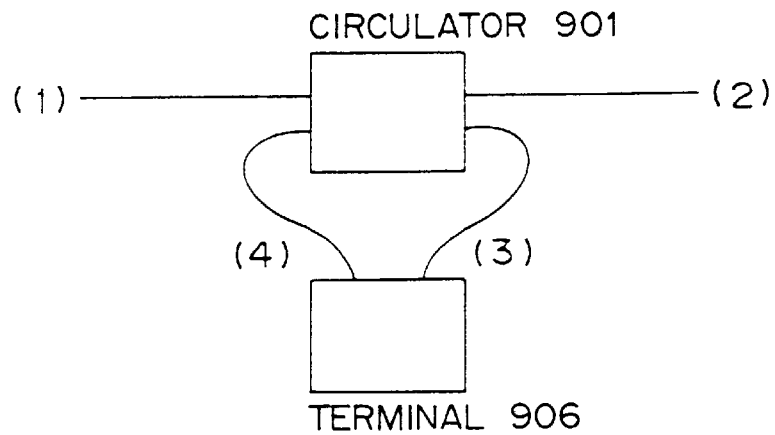

FIGS. 12A through 12C are schematic diagrams showing modifications to the optical device implemented as a optical circulator according to the present invention.

An optical circulator 901 may be configured so that light is transmitted from a light source 902 to a transmission channel 903 and the light from the same transmission channel 903 is received by a light-receiving device 904, as shown in FIG. 12A. According to such a configuration, light transmitted from the light source 902 as a signal can be transmitted to the transmission channel 903, and at the same time, the light signal transmitted from the transmission channel 903 can be received by the light-receiving device 904. Accordingly, arranging the configuration shown in FIG. 12A in a terminal station in an optical communication system allows the implementation of an optical transmitting/ receiving device equipped with transmitting/receiving capabilities.

Furthermore, the light transmitted from the transmission channel 903 may be transmitted to a fiber grating 905, etc. in order to receive a reflected light of a particular wavelength, as shown in FIG. 12B. That is, the light is input from the transmission channel 903 to the circulator 901 and transmitted to the fiber grating 905. Then, a particular wavelength is reflected, transmitted to the light-receiving device 904, and received. As described above, light of a particular wavelength among a plurality of wavelengths of light transmitted from the transmission channel 903, can be extracted, thereby using the optical circulator as a light-receiving device for each channel of a wavelength division multiplexing communication system.

Furthermore, if the optical device according to the present invention is used as a magneto-optical switch, a light signal can be transmitted/received by switching an optical path of light in transmission channels (1) and (2) depending on need, outputting the light to, for example, (3), and preparing a terminal 906 which can transmit/receive the light signal, as shown in FIG. 12C. At the same time, the result of the process performed on the transmitted light signal, can be transmitted from the transmission channel (4) to the transmission channel (2), again as a light signal.

According to the present invention, an optical device, and in particular, an optical circulator or a magneto-optical switch, which is easy to configure with a small number of components and with reduced cross talk, can be provided.

Additionally, as the number of components is small, the size of the device and its manufacturing cost are reduced.

What is claimed is:

1. An optical device, comprising:
   two polarizing prisms for splitting incident light into two linearly-polarized beams whose polarization planes are orthogonal, outputting the split beams along first and second optical paths which are parallel to each other, and combining and outputting the two linearly-polarized beams that are split and input, as output light;
   two polarization converters arranged between the two polarizing prisms;
   a deflecting device arranged between the two polarization converters, to receive linearly-polarized beams respectively in the first and second optical paths and output the beams with a first deflection angle provided thereto, and to receive linearly-polarized beams orthogonal to the linearly-polarized beams respectively in the first and second optical paths and output the beams with a second deflection angle, different than the first deflection angle, provided thereto.

2. The optical device according to claim 1, wherein the polarization converters are 45-degree Faraday rotators.

3. The optical device according to claim 1, wherein a deflection direction of the deflecting device is vertical to a plane containing the first and second optical paths which are parallel to each other.

4. The optical device according to claim 1, wherein a deflection direction of the deflecting device is parallel to a plane containing the first and second optical paths which are parallel to each other.

5. The optical device according to claim 1, wherein a deflection direction of said deflecting device is 45 degrees from a plane containing the first and second optical paths which are parallel to each other.

6. The optical device according to claim 1, wherein the incident light is a parallel beam of light.

7. The optical device according to claim 6, wherein the incident light provided by a fiber is collimated by a lens, and input to one of the two polarizing prisms; and light output as a parallel beam of light from the other of the two polarizing prisms is focused onto a fiber by a lens.

8. The optical device according to claim 1, wherein a lens for focusing respective beams and input/output fibers are arranged at positions to which the respective beams proceed, corresponding to different deflection angles at which two linearly-polarized beams that are orthogonal are deflected.

9. The optical device according to claim 7, wherein respective input/output fibers are arranged at a position at which respective beams are focused by the lens, corresponding to different deflection angles at which two linearly-polarized beams that are orthogonal are deflected by the deflecting device.

10. The optical device according to claim 9, wherein the respective input/output fibers are installed within a single ferrule, and a single lens is used to focus beams onto a plurality of fibers.

11. The optical device according to claim 1, wherein first and second birefringent wedges with identical wedge angles and different optic axes orientations are arranged respectively for the first and second optical paths as the deflecting device; and the optic axis of the first birefringent wedge is rotated by approximately 90 degrees with respect to the optic axis of the second birefringent wedge, centering substantially around a proceeding direction of the light.

12. The optical device according to claim 1, wherein first and second birefringent wedges having different optic axes orientations are arranged for each of the first and second optical paths, as the deflecting device;

the first birefringent wedges arranged in the first and second optical paths possess identical wedge angles, and the optic axis of one of the first birefringent wedges being rotated by approximately 90 degrees with respect to the optic axes of the other of the first birefringent wedges, substantially centering around a proceeding direction of the light; and the second birefringent wedges arranged in the first and second optical paths possess identical wedge angles, but their signs are different, in comparison with the respective first birefringent wedges in the first and second optical paths, the optic axes of the second birefringent wedges being rotated with respect to the corresponding optic axes of the first birefringent wedges arranged for the first and second optical paths by approximately 90 degrees, centering substantially around the proceeding direction of light.

13. The optical device according to claim 1, wherein a first birefringent wedge and a second birefringent wedge having wedge angles with opposite signs are arranged in each of the first and second optical paths, as the deflecting device;

the first birefringent wedges respectively arranged in the first and second optical paths possess wedge angles whose angles are the same, but their signs are opposite, and the first birefringent wedges have the same optic axes orientation; and the second birefringent wedges respectively arranged in the first and second optical paths having wedge angles whose angles are the same, but their signs are opposite in comparison with the first birefringent wedges in the respective first and second optical paths, the optic axes of the second birefringent wedges being rotated by approximately 90 degrees with respect to the corresponding optic axes of the first birefringent wedges arranged for the first and second optical paths, centering substantially around a proceeding direction of the light.

14. The optical device according to claim 1, wherein a single birefringent wedge is arranged for each of the first and second optical paths as said deflecting device and a wedge made of an isotropic material is arranged in the vicinity of the birefringent wedges of the optical paths;

the birefringent wedges have identical wedge angles, and the optic axis of one of the birefringent wedges is rotated by approximately 90 degrees with respect to the optic axis of the other birefringent wedge, centering substantially around a proceeding direction of the light; and a wedge angle of the wedge made of the isotropic material is larger than the wedge angles of the birefringent wedges by a ratio of an average of the refractive indices of the birefringent wedges to a refractive index of the wedge made of the isotropic material, and the sign of the wedge angle of the wedge made of the isotropic material is opposite to the sign of the wedge angles of the birefringent wedges.

15. The optical device according to claim 1, wherein birefringent wedges whose orientation of optic axes are the same are arranged as the deflecting means for the respective first and second optical paths which are parallel to each other;

two half-wave plates are arranged with the birefringent wedges between the respective first and second optical paths which are parallel to each other;

principal axes of first half-wave plates arranged in the first optical path, and principal axes of first half-wave plates arranged in the second optical path are oppositely inclined at 22.5 degrees from the vertical, and principal axes of second half-wave plates arranged for the respective first and second optical paths are oriented to the same direction as the principal axes of the first half-wave plates arranged for the respective first and second optical paths.

16. The optical device according to claim 15, wherein
the birefringent wedges whose orientation of optic axes are the same, is implemented by a single birefringent wedge which straddles the first and second optical paths.

17. The optical device according to claim 16, wherein
a material of the birefringent wedges is a single crystal of titanium dioxide.

18. The optical device according to claim 16, wherein
a material of the birefringent wedges is calcite.

19. The optical device according to claim 2, wherein
the rotation angles of the two 45-degree Faraday rotators have the same sign.

20. The optical device according to claim 2, wherein
the rotation angles of the two 45-degree Faraday rotators have opposite signs.

21. The optical device according to claim 1, wherein
the two polarizing prisms, each of which is formed by pasting glass prisms, polarize and split light by using a multilayer optical interference film between the glass prisms.

22. The optical device according to claim 1, wherein
each of the two polarizing prism, which is made of a birefringent material, splits an optical path into optical paths of ordinary and extraordinary beams of light by making light proceed in a direction of approximately 45 degrees from an orientation of an optic axis of the light.

23. The optical device according to claim 1, wherein
said deflecting device comprises two birefringent wedges which are respectively arranged in the first and second optical paths, the respective two birefringent wedges spaced evenly from a point of the polarizing prisms into which light input, which enters the optical device, or a point of the polarizing prisms from which light output, which is output from the optical device, along the first and second optical paths.

24. An optical device comprising:
a reflecting plane for reflecting light;
a polarizing prism for splitting incident light into two linearly-polarized beams whose polarization planes are orthogonal, outputting the two linearly-polarized beams respectively to first and second optical paths which are parallel to each other, combining and outputting the two linearly-polarized beams that are split and input, as output light;
a polarization converter arranged between the polarizing prism and the reflecting plane; and
deflecting device, which is arranged between the polarization converter and the reflecting plane, for providing a linearly-polarized beam in the first optical path and a linearly-polarized beam in the second optical path with a first deflection angle, and providing a linearly-polarized beam orthogonal to the linearly-polarized beam in the first optical path and a linearly-polarized beam orthogonal to the linearly-polarized beam in the second optical path with a second deflection angle, different from the first deflection angle.

25. The optical device according to claim 24, wherein
the reflecting plane is incorporated into the deflecting means.

26. The optical device according to claim 2, wherein:
an electromagnet for simultaneously inverting magnetization of the two 45-degree Faraday rotators, is included to have a capability of switching optical paths.

27. An optical device comprising:
two birefringent crystals for splitting incident light into two linearly-polarized beams whose polarization planes are orthogonal, outputting the split beams along first and second optical paths which are parallel to each other, and combining and outputting the two linearly-polarized beams that are split and input, as output light;
two polarization converters arranged between the two birefringent crystals;
a deflecting device arranged between the two polarization converters, to receive linearly-polarized beams respectively in the first and second optical paths and output the beams with a first deflection angle provided thereto, and to receive linearly-polarized beams orthogonal to the linearly-polarized beams respectively in the first and second optical paths and output the beams with a second deflection angle, different from the first deflection angle, provided thereto.

28. The optical device according to claim 27, wherein
said deflecting means comprises two birefringent wedges respectively arranged in the first and second optical paths, the respective birefringent wedges spaced evenly from a point of the polarizing prisms into which light input, which enters optical device, or a point of the polarizing prisms from which light output, which is output from the optical device, along the first and second optical paths.

29. The optical device according to claim 11, wherein
a material of the birefringent wedges is a single crystal of titanium dioxide.

30. The optical device according to claim 12, wherein
a material of the birefringent wedges is a single crystal of titanium dioxide.

31. The optical device according to claim 13, wherein
a material of the birefringent wedges is a single crystal of titanium dioxide.

32. The optical device according to claim 14, wherein
a material of the birefringent wedges is a single crystal of titanium dioxide.

33. The optical device according to claim 15, wherein
a material of the birefringent wedges is a single crystal of titanium dioxide.

34. The optical device according to claim 11, wherein
a material of the birefringent wedges is calcite.

35. The optical device according to claim 12, wherein
a material of the birefringent wedges is calcite.

36. The optical device according to claim 13, wherein
a material of the birefringent wedges is calcite.

37. The optical device according to claim 14, wherein
a material of the birefringent wedges is calcite.

38. The optical device according to claim 15, wherein
a material of the birefringent wedges is calcite.

39. The optical device according to claim 11, wherein the optic axes of the first and second birefringent wedges are approximately perpendicular to the proceeding direction of the light.

40. The optical device according to claim 12, wherein the optic axes of the first and second birefringent wedges are substantially perpendicular to the proceeding direction of the light.

41. The optical device according to claim 13, wherein the optic axes of the first and second birefringent wedges are substantially perpendicular to the proceeding direction of the light.

42. The optical device according to claim 14, wherein the optic axes of the birefringent wedges are substantially perpendicular to the proceeding direction of the light.

* * * * *